(12) United States Patent
Vandezande et al.

(10) Patent No.: US 9,339,771 B2
(45) Date of Patent: May 17, 2016

(54) THIN FILM PERVAPORATION MEMBRANES

(75) Inventors: Pieter Vandezande, Herentals (BE);
Stan Vic Valerie Claes, Diepenbeek (BE); Steven Hans Rik Wouter Mullens, Hasselt (BE)

(73) Assignee: VITO N.V., Mol (BE)

( * ) Notice: Subject to any disclaimer, the term of this patent is extended or adjusted under 35 U.S.C. 154(b) by 948 days.

(21) Appl. No.: 13/320,370

(22) PCT Filed: May 18, 2010

(86) PCT No.: PCT/EP2010/056791
§ 371 (c)(1),
(2), (4) Date: Nov. 14, 2011

(87) PCT Pub. No.: WO2010/145901
PCT Pub. Date: Dec. 23, 2010

(65) Prior Publication Data
US 2012/0061319 A1 Mar. 15, 2012

(30) Foreign Application Priority Data
May 18, 2009 (EP) .................. PCT/EP2009/056006

(51) Int. Cl.
*B01D 15/00* (2006.01)
*C02F 1/44* (2006.01)
(Continued)

(52) U.S. Cl.
CPC .......... *B01D 69/141* (2013.01); *B01D 67/0079* (2013.01); *B01D 69/02* (2013.01); *B01D 69/148* (2013.01); *B01D 61/362* (2013.01); *B01D 2325/04* (2013.01)

(58) Field of Classification Search
CPC .... B01D 61/362; B01D 69/148; B01D 69/12; B01D 71/34; B01D 61/36; B01D 67/00; B01D 71/42; B01D 3/02
USPC ........ 210/490, 500.27, 640, 321, 6; 95/45, 52
See application file for complete search history.

(56) References Cited

U.S. PATENT DOCUMENTS 4,755,193 A * 7/1988 Higashimura ......... B01D 71/44
210/500.36
4,925,562 A * 5/1990 te Hennepe .......... B01D 61/362
210/500.25

(Continued)

FOREIGN PATENT DOCUMENTS

JP 62/250907 10/1987
JP 02/222715 9/1990

(Continued)

OTHER PUBLICATIONS

Claes, S. et al., "High flux composite PTMSP-silica nanohybrid membranes for the pervaporation of ethanol/water mixtures", Journal of Membrane Science, vol. 351, No. 1-2, pp. 160-167 (2010).

(Continued)

*Primary Examiner* — Ana Fortuna
(74) *Attorney, Agent, or Firm* — Knobbe, Martens, Olson & Bear, LLP

(57) ABSTRACT

The present invention relates to novel pervaporation membranes comprising a porous support layer upon which a thin coating is applied. More specifically, the present invention provides pervaporation membranes with an improved performance by applying an aggregate filled PTMSP coating with a maximal thickness of 25 μm onto the porous support. The present invention further relates to methods of the manufacturing of such pervaporation membranes.

15 Claims, 3 Drawing Sheets

(51) Int. Cl.
*B01D 39/00* (2006.01)
*B01D 63/00* (2006.01)
*B01D 69/14* (2006.01)
*B01D 67/00* (2006.01)
*B01D 69/02* (2006.01)
*B01D 61/36* (2006.01)

(56) References Cited

U.S. PATENT DOCUMENTS

| | | | | |
|---|---|---|---|---|
| 5,085,776 | A * | 2/1992 | Blume | B01D 69/12 210/500.27 |
| 5,228,994 | A * | 7/1993 | Tkacik et al. | 210/500.29 |
| 5,281,255 | A * | 1/1994 | Toy et al. | 95/50 |
| 5,707,423 | A * | 1/1998 | Pinnau et al. | 95/45 |
| 6,316,684 | B1 | 11/2001 | Pinnau et al. | |
| 7,818,996 | B2 * | 10/2010 | Gevers et al. | 73/38 |
| 8,557,022 | B2 * | 10/2013 | De Sitter et al. | 95/45 |
| 2007/0137477 | A1 | 6/2007 | Freeman et al. | |
| 2013/0126432 | A1 * | 5/2013 | Kreiter et al. | 210/640 |

FOREIGN PATENT DOCUMENTS

| | | |
|---|---|---|
| JP | 04/045829 | 2/1992 |
| WO | WO 2009/027376 | 3/2009 |

OTHER PUBLICATIONS

De Sitter, K. et al.; "Silica filled poly(1-trimethylsilyl-1-propyne) nanocomposite membranes: Relation between the transport of gases and structural characteristics;" Journal of Membrane Science, vol. 278, No. 1-2, pp. 83-91 (2006).

* cited by examiner

THIN FILM PERVAPORATION MEMBRANES

CROSS-REFERENCE TO RELATED APPLICATIONS

This is the U.S. National Stage application of International Patent Application No. PCT/EP2010/056791, filed May 18, 2010, which claims priority to PCT/EP2009/056006, filed May 18, 2009, the disclosures of each of which are hereby incorporated by reference in their entirety herein.

FIELD OF THE INVENTION

The present invention relates to pervaporation membranes comprising a porous support layer upon which a thin coating is applied. More specifically, the present invention provides pervaporation membranes with an improved performance. The present invention further relates to methods for the manufacturing of such pervaporation membranes.

BACKGROUND OF THE INVENTION

At present organophilic pervaporation (OPV) is a promising separation technique that involves the use of non-porous polymeric membranes, which are brought into contact with a liquid stream containing two or more miscible components of which one or more organic solvents. In contrast to hydrophilic pervaporation, which is for instance applied in solvent dewatering, OPV membranes preferentially remove the organic components from the mixture due to their higher affinity for, and/or quicker sorption in the hydrophobic membrane. The driving force for the transport of components through pervaporation membranes is the chemical potential gradient and more specifically the partial vapour pressure gradient of the components at the feed and permeate side. The mass transport in pervaporation is generally described by the solution-diffusion model, which is based on a three-step transport mechanism consisting of (i) sorption of the permeant from the feed mixture at the upstream side of the membrane, (ii) diffusion of the permeant through the membrane, and (iii) desorption of the permeant at the downstream side of the membrane. The vaporous permeate is subsequently condensed to obtain a liquid product. According to the solution-diffusion mechanism, the pervaporation flux is a function of the solubility in and diffusivity through the membrane. Membrane selectivity is thus affected by the solubility of a compound in the polymer, which is determined by the permeate-membrane interaction, and the diffusivity which is generally governed by the molecular size, shape and mass of the permeant.

The number of commercial OPV membranes that combine a high selectivity with an elevated pervaporation flux, and moreover show long-term stability in organic solvents is however restricted at present. OPV did therefore not yet realize a breakthrough in industrial processes so far, despite its clear environmental and economical advantages and the great application potential in the process industry. Several polymers have been used for the synthesis of OPV membranes, e.g. polydimethylsiloxane (PDMS), polytetrafluoroethylene (PTFE), ethylene-propylene-diene terpolymer (EPDM), polyurethaneurea (PU), poly(ether-block-amide) (PEBA) and poly(1-trimethylsilyl-1-propyne) (PTMSP).

U.S. Pat. No. 6,316,684 provides separation membranes comprising a polymer with particles dispersed therein. In the examples, poly(4-methyl-2-pentyne) (PMP) and poly(1-trimethylsilyl-1-propyne) (PTMSP) membranes are cast on a glass plate.

PTMSP is a substituted polyacetylene that combines a rigid backbone chain with trimethylsilyl side-groups. These bulky groups restrict rotational mobility and limit the polymer's ability to pack together. PTMSP is a hydrophobic glassy polymer (Tg>300° C.) with an extremely high free volume fraction (up to 25%) and it exhibits intrinsic nanoporosity. PTMSP is one of the most studied polymers for gas separation applications. PTMSP-based gas separation membranes have already been disclosed in De Sitter et al. (in "Silica filled poly(1-trimethylsilyl-1-propyne) nanocomposite membranes: relation between the transport of gases and structural characteristics", Journal of Membrane Science vol. 278 (2006), pp. 83-91) wherein a method for preparing a filled polymeric membrane is described. Nonporous PTMSP membranes have also been applied in the pervaporative separation of aqueous alcohol mixtures, and recently also in nanofiltration of alcoholic feed solutions. However, these dense PTMSP membranes generally exhibited low permeate fluxes. WO 2009/027376 provides a PTMSP layer with a thickness of about 30 μm cast upon a porous polyacrylonitrile substrate.

Therefore, at present there is a pressing need for OPV membranes that combine a high alcohol/water selectivity with an elevated pervaporation flux, and moreover show long-term stability in strongly swelling organic solvents.

The present invention aims at providing OPV membranes that combine the required characteristics: a high selectivity, an elevated pervaporation flux and a long-term stability. The present invention also aims to provide methods for manufacturing such membranes. The present invention also aims to provide membrane separation processes having an improved performance over processes of the prior art. Particularly, the present invention aims to provide an improved pervaporation process, in particular for separating alcohols from dilute aqueous mixtures.

SUMMARY OF THE INVENTION

The present invention provides novel pervaporation membranes comprising a porous support layer upon which a thin coating or film is applied. Said thin coating or film is preferably a coating comprising a, preferably non-porous, glassy substituted polyacetylene material such as PTMSP, preferably filled with nanoparticles such as silica or other non-porous inorganic particles such as metal oxides. The novel pervaporation membranes according to the present invention have been shown to improve membrane separation processes. Particularly, the pervaporation membranes according to the present invention enable to perform solvent/water separations, and in particular allow to separate solvents from dilute aqueous mixtures.

As described in the present invention, the inventors have surprisingly found that by applying a coating, and preferably an aggregate filled PTMSP coating, with a maximal average thickness of 25 μm onto a porous support such as a polyacrylonitrile (PAN) or polyvinylidene fluoride (PVDF) membrane, the performance of the resulting pervaporation membranes is improved. The pervaporation membranes of the present invention show a high selectivity in the separation of solvents, particularly alcohols, from water, combined with an elevated pervaporation flux. The porous support, typically an ultrafiltration membrane, provides mechanical stability to the top layer without affecting its selectivity and flux in pervaporation.

The present invention therefore relates to a novel pervaporation membrane provided with an aggregate filled PTMSP coating on a porous support, wherein the average thickness of said coating is at most 25 μm.

The inventors have found that the application of a coating with an average thickness smaller than 25 µm onto a porous support provides a pervaporation membrane with enhanced properties. The pervaporation membranes of the present invention show a high solvent/water selectivity, combined with an elevated pervaporation flux.

In a particular embodiment, the present invention relates to a pervaporation membrane according to the present invention comprising a polyacrylonitrile (PAN) porous support with a PTMSP-silica coating, wherein the average thickness of said coating ranges between 2 and 25 µm, and is more particularly less than 25 µm, most particularly less than 23 µm, 20 µm, 17 µm or even less than 15 µm.

In a particular embodiment, the present invention relates to a pervaporation membrane according to the present invention comprising a polyvinylidene fluoride (PVDF) porous support with a PTMSP-silica coating, wherein the average thickness of said coating ranges preferably between 0.5 and 25 µm, and is particularly less than 20 µm, more particularly less than and 15 µm, 12 µm 9 µm, or even less than 5 µm.

In a more particular embodiment of the present invention, the pervaporation membrane according to the present invention provides an (ethanol/water) pervaporation flux of at least 2.0 kg/(m$^2$·h), and preferably at least 2.1, 2.2, 2.3, 2.4 or 2.5 kg/(m$^2$·h). More preferably the (ethanol/water) pervaporation flux of the pervaporation membranes according to the present invention are at least 2.6, 2.7, 2.8, 2.9, 3.0, 3.1, 3.2, 3.3, 3.4, 3.5, 3.6, 3.7, 3.8, 3.9, 4.0, 4.5, 5.0, 5.5 or 6.0 kg/(m$^2$·h), or more.

According to another embodiment, the present invention relates to a method for the manufacturing of a pervaporation membrane, wherein the method comprises the steps of:
(a) coating an aggregate filled PTMSP solution on top of a porous polymeric support; and,
(b) evaporating said aggregate filled PTMSP solution on said porous support for at least 8 hours at a temperature ranging between 20 and 25° C., thereby providing a pervaporation membrane provided with a aggregate filled PTMSP coating onto said porous support.

According to another embodiment, the present invention relates to an apparatus for separating a mixture of components by pervaporation or nanofiltration, wherein the apparatus comprises the pervaporation membrane according to the present invention. The pervaporation membranes according to the present invention can find application in apparatuses for separating a mixture of components by pervaporation or nanofiltration. The pervaporation membranes according to the present invention can advantageously be used in processes for separating a mixture of (fluid) components.

According to another embodiment, the present invention relates to the use of a pervaporation membrane according to the present invention in a process of separating a mixture of components by pervaporation or nanofiltration.

These and further aspects and embodiments are described in the following sections and in the claims.

DETAILED DESCRIPTION OF THE INVENTION

Figure 1:
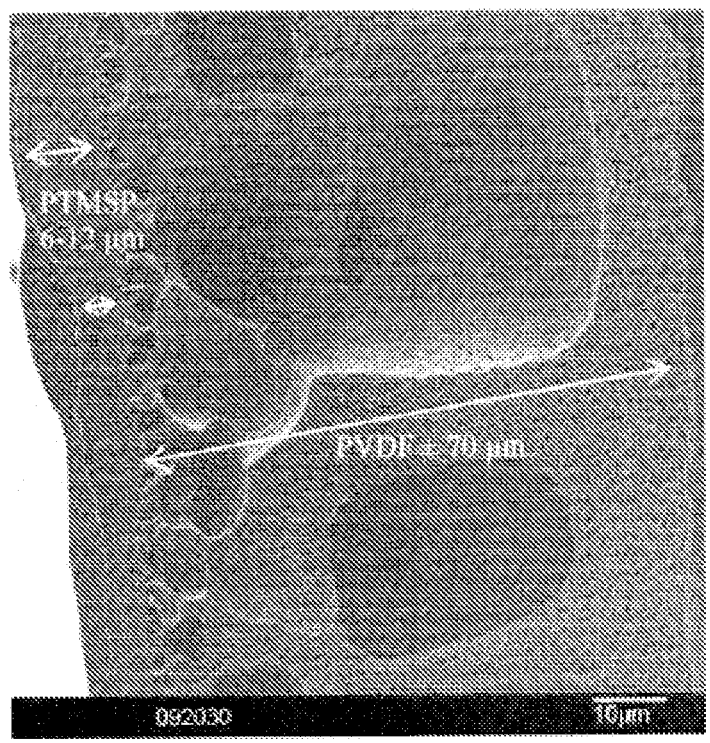
FIG. 1 provides a SEM image of a cross-section of a thin film PTMSP pervaporation membrane according to an embodiment of the present invention comprising a thin PTMSP-silica coating applied onto a PVDF porous support layer.

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may be used in the practice or testing of the present invention, the particular methods and materials are now described.

In this specification and the appended claims, the singular forms "a", "an", and "the" include plural references unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of". The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

The present invention provides novel pervaporation membranes comprising a porous support layer upon which a thin coating or film is applied. Said thin coating or film is preferably a coating comprising a, preferably non-porous, material in the form of nanoparticles such a silica, other metal oxides and/or aggregates thereof, in combination with a glassy polymer. The nanoparticles are preferably non-porous and preferably have a high specific surface area. The nanoparticles can be treated or coated, e.g. to make them hydrophobic. The glassy polymer refers to a polymer having a glass transition temperature above the temperature at which the polymer will be used. The glassy polymers used for the present invention have a glass transition temperature of at least 100° C. The glassy polymers preferably have a high free volume, meaning a fractional free volume of at least 0.20. Possible glassy polymers envisaged by the invention are substituted polyacetylene polymers, such as, but not limited to, PTMSP, PTBA (poly(tert-butylacetylene)), PPP (poly(1-phenyl-1-propyne)), PTMSDPA (poly[1-phenyl-2[p-(trimethylsilyl)

phenyl]acetylene]), PTMGP (poly(1-trimethylgermyl-1-propyne)) and/or PMP (poly(4-methyl-2-pentyne)). Preferably the glassy polymers used in the pervaporation membranes according to the present invention are substituted polyacetylene polymers and more preferably PTMSP.

According to the present invention membranes are provided wherein a coating of a glassy polymer is applied onto a porous support which can in turn be supported by a woven or non-woven substrate backing. The porous supports according to the invention include, but are not limited to polyimide (PI), polyetherimide (PEI), polyamide (PA), poly(amide hydrazide) (PAH), polysulfone (PSf), polyethersulfone (PES), polyphenylsulfone (PPSf), polyphenylene sulfide sulfone (PPSS), poly (ether ether ketone), poly(phthalazinone ether sulfone ketone) (PPESK), cellulose acetate (CA), polybenzimidazole (PBI), polyacrylonitrile (PAN) or polyvinylidene fluoride (PVDF) membranes, and preferably polyacrylonitrile (PAN) or polyvinylidene fluoride (PVDF) membranes.

Alternatively ceramic supports may be used as porous support in the pervaporation membranes according to the present invention. The pervaporation membranes of the present invention show a high selectivity, combined with an elevated pervaporation flux. By providing an additional support, typically an ultrafiltration membrane, upon which a thin selective top layer is provided, the mechanical stability of the membrane is established without significantly affecting the selectivity. Furthermore, the structure of the porous support enables the efficient application of the coating.

It has been found that membranes can be provided comprising an aggregate filled coating of 25 μm or less on a porous support and that the performance of the resulting pervaporation membranes is significantly increased, compared to those described in the prior art. The inventors have found that the alcohol/water flux, and more particularly the ethanol/water flux through the membranes is significantly increased without significantly affecting the selectivity of the membrane.

The inventors have found that a reduction of the average coating thickness, thereby providing that the coating has a maximal average thickness of 25 μm, or a coating with a maximal average thickness of 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, 4 μm, 3 μm, 2 μm, 1 μm or 0.5 μm, provides pervaporation membranes that show a high selectivity, combined with an elevated pervaporation flux. The pervaporation flux has been found to decrease severely when the average thickness of the coating increases with only a few micrometers, hence having a major negative effect on the performance of the pervaporation membrane. A small increase of the average coating thickness to about 30 μm shows a reduction of the pervaporation flux with 25% or more compared to the pervaporation flux of the membranes according to the present invention. By providing pervaporation membranes comprising e.g. a silica filled poly(1-trimethylsilyl-1-propyne) coating on top of a porous support, wherein the average thickness of said coating is at most 25 μm, the inventors have found that the pervaporation flux through the membrane increases significantly and more than what would be expected.

The term "pervaporation" as used in the present application refers to a method for the separation of mixtures of liquids by partial vaporization through a non-porous membrane. This membrane-based process comprises two basic steps, firstly the permeation of the permeate through the membrane, followed by their evaporation into the vapor phase. This process is used by a number of industries for different processes, including purification and analysis processes.

The pervaporation membrane therefore acts as a selective barrier between two phases, the liquid phase feed and the vapor phase permeate. It allows the desired component(s) of the liquid feed to be transferred through the membrane by vaporization. Separation of components is based on a difference in transport rate of individual components through the membrane. Typically, the upstream side of the membrane is at ambient pressure and the downstream side is under vacuum or swept with an inert gas to allow the evaporation of the selective component after permeation through the membrane. Driving force for the separation is the difference in the partial pressures of the components on the two sides and not the volatility difference of the components in the feed.

The separation of components (e.g. water and a solvent such as an alcohol) is based on a difference in transport rate of individual components through the membrane. This transport mechanism can be described using the solution-diffusion model, based on the rate/degree of dissolution of a component into the membrane and its velocity of transport (expressed in terms of diffusivity) through the membrane, which will be different for each unique feed component or membrane material couple.

Pervaporation is used on an industrial scale to separate solvents such as ethanol from its dilute aqueous solutions. One of the applications wherein ethanol/water separation is the key factor is the production of bio-ethanol. Bio-ethanol can be produced from the fermentation of sugar by enzymes produced from specific varieties of yeast. In order for the ethanol not to negatively influence the fermentation process (product inhibition of microorganisms), the alcohol produced should be continuously removed from the reaction mixture. This can be performed by conventional techniques, such as distillation and solvent extraction, but these processes are very energy consuming as the aqueous solutions usually only contain very low solvent concentrations. Pervaporation with ethanol-selective membranes allows to separate low-concentration bio-ethanol from fermentation broths in an economically effective way. Pervaporation is a process which is commonly used for the separation of diluted aqueous mixtures containing organic solvents, such as alcohols including ethanol, butanol, etc.

The present invention therefore relates to a novel pervaporation membrane provided with an aggregate filled PTMSP coating on a porous support, wherein the average thickness of said coating is at most 25 μm. In particular embodiments, the average thickness of said aggregate filled coating is larger than 250 nm and smaller than 25 μm, 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, 4 μm, 3 μm, 2 μm, 1 μm or 0.5 μm.

The inventors have found that the application of an aggregate filled PTMSP coating or a coating of PTMSP comprising aggregates of nanoparticles, and preferably a silica filled PTMSP or PTMSP-silica coating, with an average thickness smaller than 25 μm onto a porous support, provides a pervaporation membrane with enhanced properties. The pervaporation membranes of the present invention show a high selectivity, combined with an elevated pervaporation flux.

It should be noted that a skilled person will appreciate that the aggregate filled PTMSP coating on the porous support can more generally be described as a coating comprising a, preferably non-porous, material in the form of nanoparticles such as silica, metal oxides and/or aggregates thereof, in combination with a glassy polymer. The nanoparticles preferably have a high specific surface area. The nanoparticles can be treated or coated, e.g. to make them hydrophobic. The glassy polymer refers to a polymer having a glass transition temperature above the temperature at which the polymer will be used. The glassy polymers used for the present invention have a glass transition temperature of at least 100° C. The glassy polymers preferably have a high free volume, meaning a fractional free volume of at least 0.20. Possible glassy polymers envisaged by the invention are substituted polyacetylene polymers, chosen from, but not limited to, PTMSP, PTBA, PPP, PTMSDPA, PTMGP and/or PMP. Preferably the glassy polymers used in the pervaporation membranes according to the present invention are substituted polyacetylene polymers and more preferably PTMSP. Other types of nanoparticle fillers may include metal organic frameworks, silsesquioxanes, nanozeolites and/or carbon nanotubes.

Preferably the pervaporation membrane according to the present invention comprises a polyacrylonitril (PAN) or polyvinylidene fluoride (PVDF) porous support. PAN is obtained through the polymerization of acrylonitril. PAN thereby forms long linear molecules in the form of for instance fibers or sheets. PVDF refers to a highly non-reactive and pure thermoplastic fluoropolymer. PVDF is a specialty plastic material in the fluoropolymer family, generally used in applications requiring high purity, strength, and resistance to solvents, acids, bases and heat.

The inventors have found that the application of the coating onto a PAN or PVDF porous support provides mechanical stability for the pervaporation membrane without affecting the selectivity significantly. Furthermore, the pervaporation flux through the membrane has been increased.

In a particular embodiment, the present invention relates to a pervaporation membrane according to the present invention comprising a PAN porous support with a PTMSP-aggregate filled coating, wherein the average thickness of said coating ranges between 2 and 25 μm, and for instance between between 15 and 25 μm, between 17 and 23 μm and for instance about 20 μm. In particular embodiments, the average thickness of said aggregate filled PTMSP coating on said PAN porous support is larger than 250 nm and smaller than 25 μm, 24 μm, 23 μm, 22 μm, 21 μm, 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, 4 μm, 3 μm, 2 μm, 1 μm or 0.5 μm.

In a more particular embodiment, the present invention relates to a pervaporation membrane according to the present invention comprising a polyvinylidene fluoride (PVDF) porous support with a aggregate filled PTMSP coating, wherein the average thickness of said coating ranges preferably between 0.5 and 25 μm, between 2.5 and 20 μm, for instance between 5 and 15 μm, between 6 and 12 μm or between 5 and 9 μm. In particular embodiments the average thickness of said PTMSP aggregate filled coating on said PVDF porous support is larger than 250 nm and smaller than 25 μm, 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, 4 μm, 3 μm, 2 μm, 1 μm or 0.5 μm.

It should be noted that a skilled person will appreciate that the average thickness of said coating refers to the average thickness of the layer on top of the porous support. A skilled person will further appreciate that while conducting the coating process, part of the coating material will infiltrate the porous support thereby providing a deposition of the coating material in the porous support.

By using pervaporation membranes comprising a porous support in combination with a coating having an average thickness as provided here above, the inventors have found that the pervaporation flux increases significantly without any loss in selectivity. Furthermore, the specific properties of PVDF (highly non-reactive, high purity and strength, and resistance to solvents, acids, bases and heat) provide the pervaporation membranes according to the present invention with a long-term stability and high resistance in organic solvents. This is especially useful since the pervaporation membranes according to the present invention are especially useful in the treatment of liquid streams containing organic solvents.

In particular embodiments, the membranes according to the invention are at least partially water saturated. More particularly the pervaporation membrane according to the present invention comprises a polyvinylidene fluoride (PVDF) porous support wherein the water saturation of said porous support upon coating is at least 50%, at least 60%, at least 70%, at least 80%, at least 85%, at least 90% or at least 95%.

The inventors have additionally found that the water saturation of the, preferably PVDF, porous support plays an important role in the pervaporation flux through the membrane. An increasing water saturation of the, preferably PVDF, porous support has been shown to increase the pervaporation flux through the membrane. Compared to a dry PVDF porous support, a PVDF porous support with an elevated water saturation has shown an increase in the pervaporation flux with at least 20%, preferably at least 30%, more preferably at least 40% and most preferably at least 50%.

The water saturation, as used herein, can be defined as the degree of saturation of the porous support. The degree of saturation ($S_W$) may be defined as:

$$S_W = \frac{V_W}{V_V} = \frac{V_W}{V_T \cdot \phi} = \frac{\theta}{\phi}$$

Wherein $\phi$ refers to the porosity of the material, $V_V$ the volume of the pore space, $V_W$ the water volume, $V_T$ the total volume of the material and $\theta$ the volumetric water content. The values for the degree of saturation can range from 0 (dry) to 1 (saturated).

In alternative embodiments, the membranes according to the invention are not water saturated.

According to the present invention the glassy coating, more particularly the PTMSP coating is filled with an aggregate. This implies that the dense coating, preferable consisting of a high free volume polymer, comprises particles, more particularly nanoparticles which are non-porous and which are present as an aggregate, i.e. the particles interact as a result of van der Waals forces or chemical bonding. In particular embodiments, the particles are silica or other non-porous inorganic particles such as metal oxides.

In a particular embodiment the membranes according to the invention preferably comprise between 0.01 wt % and 90 wt % non-porous particles, more preferably between 0.01 wt % and 60 wt % non-porous particles, even more preferably between 0.01 wt % and 50 wt %, between 0.01 wt % and 40 wt %, between 0.01 wt % and 30 wt %, between 0.01 wt % and 20 wt % or between 0.01 wt % and 10 wt % non-porous particles. The membranes according to the invention can comprise between 70 wt % and 90 wt % non-porous particles. The membranes of the invention preferably comprise between 0.003 vol % and 75 vol %, between 0.01 wt % and 50 wt % non-porous particles. The wt % provided herein is based on the amount of dry substance.

According to particular embodiments, the aggregate filled coating is obtained by the method described by De Sitter et al. (Journal of Membrane Science vol. 278 (2006), pp. 83-91, incorporated herein by reference). Briefly, the method of manufacturing the membrane is a three-step solvent casting procedure. First, the silica is dispersed in toluene by 30 minutes ultrasonic and 3 hours magnetic stirring. Secondly, the PTMSP is dissolved in the silica/toluene dispersion and finally, the solution is cast on a glass plate and dried. By that method, membranes are obtained comprising aggregates of silica.

It has been observed that in these embodiments, the particle aggregates in the polymer matrix comprise interstitial nanometre-sized cavities, the average size of which increases with increasing filler content. The aggregate filled coating provides an increased permeability compared to pure (non-filled) PTMSP membranes, the permeability increasing with increasing filler content.

In particular embodiments the filler particles are arranged in aggregates having an average aggregate size of at least 50 nm and smaller than 350 nm, and preferably smaller than 200 nm. The size distribution of the aggregates can have a standard deviation smaller than or equal to 300 nm, preferably smaller than or equal to 250 nm, preferably smaller than or equal to 200 nm, preferably smaller than or equal to 150 nm, preferably smaller than or equal to 100 nm and more preferably smaller than 50 nm. This means that the aggregate size is preferably so distributed to have standard deviations as indicated. Average aggregate sizes and standard deviations are based on number distribution. Aggregate size distributions in the membranes according to the invention are preferably those falling in the range as indicated in Table 1, more preferably those falling in the range as indicated in Table 2.

TABLE 1

Preferable aggregate size distribution in the membranes according to the invention.

| Aggregrate size (nm) | Size occurrence (%) |
|---|---|
| <100 | 10-40 |
| 100-200 | 20-75 |
| >200 | 10-49 |

TABLE 2

More preferable aggregate size distribution in the membranes according to the invention.

| Aggregrate size (nm) | Size occurrence (%) |
|---|---|
| <100 | 10-40 |
| 100-200 | 20-75 |
| 200-300 | 10-25 |
| >300 | 0-24 |

A well-defined aggregate size distribution leads to a product with a uniform and repeatable performance. Indeed, aggregates that are too large can form interstitial cavities that are too large, which negatively affects the selectivity of a membrane. Therefore, in most cases the aggregate size is preferably selected such that an optimal balance is obtained between permeability and selectivity of the membrane.

In a particular embodiment, the membranes comprise a silica filled PTMSP coating. As used herein the silica filled PTMSP coating refers to coating material comprising silica and PTMSP. More preferably the coating is the result of the application of a coating solution onto the porous support, as is detailed below. In more particular embodiments, said coating solution comprises between 0.1 and 50 wt % silica, between 0.1 and 5 wt % PTMSP dissolved in a solvent. Said solvent is preferably toluene, hexane, benzene, diethyl ether, chloroform, ethyl acetate or a combination or mixture thereof, and preferably toluene. Preferably said coating solution comprises 0.5 to 2.5 wt % silica, 0.5 to 2.5 wt % PTMSP and 95 to 99 wt % solvent, more preferably 1 to 2 wt % silica, 1 to 2 wt % PTMSP and 96 to 98 wt % solvent. Most preferably said coating solution comprises 1.5 wt % silica, 1.5 wt % PTMSP and 97 wt % solvent.

As detailed above, the membranes according to the present invention have properties which are of particular interest, more particularly a high flux rate and a high selectivity.

In a more particular embodiment of the present invention, the pervaporation membrane according to the present invention provides an (ethanol/water) pervaporation flux (measured for a 10/90 (v/v) % ethanol/water mixture at a temperature of about 50° C.) of at least 2.0 kg/(m²·h), and preferably at least 2.1, 2.2, 2.3, 2.4 or 2.5 kg/(m²·h). More preferably the (ethanol/water) pervaporation flux of the pervaporation membranes according to the present invention are at least 2.6, 2.7, 2.8, 2.9, 3.0, 3.1, 3.2, 3.3, 3.4, 3.5, 3.6, 3.7, 3.8, 3.9, 4.0, 4.5, 5.0, 5.5 or 6.0 kg/(m²·h), or more.

As used herein the amount of transport of compounds per unit area and per unit time through the membrane is defined as the pervaporation flux. The pervaporation flux may be gravimetrically determined and calculated according to equation:

$$J = \frac{m}{A \cdot t}$$

where, m denotes the weight of permeated liquid per unit membrane area A and filtration time t.

In a more particular embodiment of the present invention, the pervaporation membrane according to the present invention provides a (ethanol/water) separation factor α (EtOH/H₂O) of at least 8, more particularly at least 9, most particularly at least 10 and even more particularly at least 15, at least 20 or at least 25. Said separation factor is a parameter characterizing the selectivity of the pervaporation membrane. The separation factor can be calculated according to equation:

$$\alpha = \frac{Y_{EtOH}}{Y_{H_2O}} \cdot \frac{X_{H_2O}}{X_{EtOH}}$$

in which X and Y represent weight fractions in the retentate and permeate, respectively.

Furthermore, the pervaporation membrane according to the present invention provides a pervaporation separation index (PSI) of at least 20 kg/(m²·h), preferably at least 24 kg/(m²·h), more preferably at least 30 kg/(m²·h) and most preferably at least 35 kg/(m²·h). The pervaporation separation index (PSI) is a general parameter combining the pervaporation flux and the separation factor in a single parameter. The pervaporation separation index (PSI) can be calculated using equation:

$$PSI = J \cdot (\alpha - 1)$$

A person skilled in the art may note that the PSI is zero when the separation factors equals unity. In that specific case no separation occurs.

In a more particular embodiment, the present invention relates to a pervaporation membrane wherein said pervaporation membrane comprises an additional support. Said additional support is preferably a woven or non-woven tissue made of a material chosen from, but not limited to, polyester, polyethylene, polypropylene, and/or combinations thereof.

A further aspect of the present invention relates to methods for the manufacturing of a pervaporation membrane, wherein the methods comprises the steps of:
(a) coating a porous support with a PTMSP solution comprising aggregated nanoparticles; and,
(b) evaporating said aggregate filled PTMSP solution on said porous support for at least 8 hours at a temperature ranging between 20 and 75° C., thereby providing a pervaporation membrane provided with an aggregate filled PTMSP coating onto said porous support.

The coating of said porous support with said aggregate filled PTMSP solution, and preferably a PTMSP-silica solution, may occur through coating techniques known in the art such as, but not limited to, dipping, painting, spraying, dabbing or pouring the coating solution onto the porous support.

In order to provide a thin coating with the required characteristics it is essential for the evaporation of the coating solution to occur in a gradual and controlled manner. If the coating solution is dried in a rapid manner the inventors have found that the coating thickness is highly irregular and does not provide the pervaporation membranes according to the present invention with the required characteristics. The evaporation of the coating solution preferably occurs at a temperature between 20 and 75° C., preferably a temperature between 20 and 55° C. ambient temperature, more preferably a temperature between 20 and 40° C. and even more preferably at an ambient temperature and preferably a temperature between 20 and 25° C. for a period of at least 8 hours, preferably at least 12 hours and more preferably at least 20 hours and preferably for at least 24 hours.

The aggregate filled PTMSP solution used in the methods according to the invention in specific embodiments refers to a PTMSP-silica solution comprising between 0.1 and 50 wt % silica, between 0.1 and 5 wt % PTMSP dissolved in a solvent wherein said solvent is preferably toluene, hexane, benzene, diethyl ether, chloroform, ethyl acetate or a combination or mixture thereof, and preferably toluene. Preferably said PTMSP-silica solution comprises 0.5 to 2.5 wt % silica, 0.5 to 2.5 wt % PTMSP and 95 to 99 wt % solvent, more preferably 1 to 2 wt % silica, 1 to 2 wt % PTMSP and 96 to 98 wt % solvent. Preferably the PTMSP-silica solution refers to solution comprising 1.5 wt % silica, 1.5 wt % PTMSP and 97 wt % solvent. It should further be noted that the ratio of silica versus PTMSP ranges between 2:1 and 1:2 and preferably the ratio is 1:1. The evaporation of the PTMSP-silica solution may occur using evaporation techniques well known in the art and preferably evaporating for at least 24 hours under ambient conditions and preferably at 22° C.

The method according to the present invention may further comprise a step wherein the pervaporation membrane of step (b) is thermally treated, thereby removing residual solvent. Said thermal treatment as used herein may comprise the treatment of the pervaporation membrane of step (b) for at least 1 hour at a temperature of at least 65° C., and more preferably at a temperature ranging between 65° C. and 75° C.

More particularly, the method of the present invention deposits a PTMSP-silica coating onto a porous support, wherein the average thickness of said coating is at most 25 µm. Preferably in case said coating is deposited onto a PAN porous support, the average thickness of the coating ranges between 2 and 25 µm, and for instance between 15 and 25 µm, between 17 and 23 µm or about 20 µm. Preferably in case said coating is deposited onto a PVDF porous support, the average thickness of said coating ranges preferably between 0.5 and 25 µm, more particularly less than 20 µm, less than 15 µm, less than 12 µm, most particularly less than 9 µm or even less than 5 µm.

A further aspect of the present invention relates to tools such as an apparatus, for separating a mixture of components by pervaporation or nanofiltration, which comprise the pervaporation membrane according to the present invention. The pervaporation membranes according to the present invention can find application in apparatuses for separating a mixture of components by pervaporation or nanofiltration. The pervaporation membranes according to the present invention can advantageously be used in processes for separating a mixture of (fluid) components.

Yet a further aspect of the present invention relates to the use of a pervaporation membrane according to the present invention in a process of separating a mixture of components by pervaporation or nanofiltration.

More preferably the use of a pervaporation membrane according to the present invention in a process of separating a mixture of water and an alcohol components, preferably into in an alcohol-rich fraction and an alcohol-poor fraction, by pervaporation or nanofiltration. Said alcohols may for instance be chosen from methanol, ethanol, n-propanol, iso-propanol, n-butanol, isobutanol, 2-butanol and/or tert-butanol.

The pervaporation membranes according to the present invention are also frequently used in OPV processes wherein organic components such as bioproducts including bio-alcohols, are separated from a diluted aqueous liquid such as a fermentation broth. Also for the isolation and purification of aroma compounds such as odours and fragrances the pervaporation membranes according to the present invention may be used.

Additional applications include organic solvent nanofiltration wherein small dissolved organic compounds are separated from organic solvents. Typical uses include solvent recovery, concentration, isolation and purification of small molecules and the recovery and re-use of (homogeneous) catalysts.

The processes wherein the pervaporation membranes according to the present invention are used have shown to provide a highly-efficient alternative for other separation techniques known in the art such as distillation. The pervaporation membranes according to the present invention further provide a mild, non-destructive separation technique enabling the separation of azeotropes, close-boiling and/or thermosensitive liquid mixtures. The pervaporation membranes are furthermore easily scalable and integratable in complex processing systems. The pervaporation membranes are also stable in a wide range of solvent environments and additionally show an improved performance compared to commercially available membranes.

EXAMPLES

Example 1

Example Showing the Characteristics of the Thin Film PTMSP Membranes

The present example provides a comparison of the membranes according to the present invention with commercial available membranes.

The membranes according to the present invention use a porous support prepared from polyacrylonitrile (PAN) or polyvinylidene fluoride (PVDF) and are covered with a thin, selective top layer prepared from poly(1-trimethylsilyl-1-propyne) (PTMSP) and hydrophobic silica. The commercial membranes used in the present example are PERVAP 4060 and Pervatech PDMS.

Casting solutions containing 15 wt % PAN or PVDF in N-methylpyrrolidinone (NMP) were prepared and magnetically stirred until complete dissolution. The homogeneous solutions were then cast on a polyester fabric using an automatic film applicator. Immediately after casting, the nascent polymer films were immersed in a distilled water bath at room temperature where demixing and solidification took place. After 30 minutes, the membranes were removed from the coagulation bath and gently boiled for 1 hour in distilled water. Subsequently, the membranes were cooled down to room temperature and stored in an aqueous formaldehyde solution (1 wt %) to inhibit pore collapse and microbial growth.

Thin PTMSP-silica films were either applied on a dry support, or on a support saturated with the aqueous formaldehyde solution. In the latter case only the surface moisture was removed by gently patting the surface with absorbing tissue paper. Dry support membranes, on the other hand, were obtained by vacuum-drying for 1 hour at 60° C. Thin film composite membranes were prepared by coating a PTMSP-silica solution on the PAN or PVDF support. This coating solution, consisting of 1.5 wt % PTMSP, 1.5 wt % silica and 97 wt % toluene, was prepared by adding the hydrophobic silica to toluene at a concentration of 1.5 wt %, after which the dispersion was ultrasonically treated for 30 minutes and then magnetically stirred for 3 hours. To this dispersion, 1.5 wt % of PTMSP was added and the polymer-silica suspension was magnetically stirred for 4 days until complete dissolution of the polymer. After application, the coating was evaporated for 24 hours in ambient air (22° C.), and the resulting thin film membrane was thermally treated for 1 hour at 70° C. in a vacuum oven to remove the residual toluene. The final vacuum-dried membrane sheets were stored under dry conditions.

Scanning electron microscopy (SEM) combined with ImageJ image analysis software was used to determine the surface porosity of the support. A JEOL cold field emission scanning electron microscope (FEGSEM) type JSM6340F, was used to observe membrane surfaces and cross-sections Pervaporation measurements were carried out on a laboratory-developed pervaporation system wherein two Amafilter test cells with an effective membrane area of 3.7 cm$^2$ were used. The feed was circulated with a centrifugal pump and kept at a constant temperature using an immersion heating circulator with microprocessor control. Heating elements were placed on top of the permeate vessels to prevent the pipelines from freezing. A medium vacuum was maintained at the permeate side with a rotary vane vacuum pump. The membranes were placed into the test cells, after which a 10 wt % aqueous ethanol feed mixture was circulated over the membranes at about 12 L/h. The feed was kept at 50° C. and the vapor-side pressure maintained at about 0.04 mbar. The permeate was condensed in a stainless steel vessel immersed in a cooling cylinder filled with liquid nitrogen. After the initial non-equilibrium conditions during which the permeate was discarded, a sample was collected. Feed, concentrate and permeate samples were analyzed for water on a semi-automatic, volumetric Karl-Fisher titrator. The pervaporation flux was gravimetrically determined and calculated according to equation:

$$J = \frac{m}{A \cdot t}$$

where, m denotes the weight of permeated liquid per unit membrane area A and filtration time t.

The separation factor α (EtOH/H$_2$O) was calculated according to equation:

$$\alpha = \frac{Y_{EtOH}}{Y_{H_2O}} \cdot \frac{X_{H_2O}}{X_{EtOH}}$$

in which X and Y represent weight fractions in the retentate and permeate, respectively. To summarize pervaporation flux and separation factor in one composite figure of merit, the pervaporation separation index (PSI) was calculated using equation:

PSI=$J \cdot (\alpha-1)$

Note that the PSI is zero when the separation factors equals unity, since no separation occurs.

All reported fluxes and selectivities are average values based on eight PV measurements on circular coupons cut from two membrane sheets (4 coupons each). Flux and selectivity values displayed a variance of less than 8%.

Figure 2:
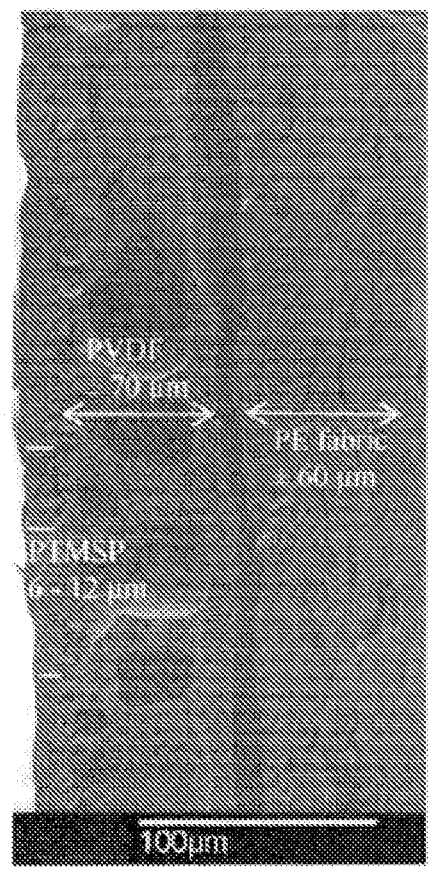
FIG. 2 provides a SEM image of a cross-section of a thin film PTMSP pervaporation membrane according to an embodiment of the present invention comprising a thin PTMSP-silica coating applied onto a PVDF porous support layer. Said PVDF porous support layer is further attached to a polyester fabric support.
Figure 3:
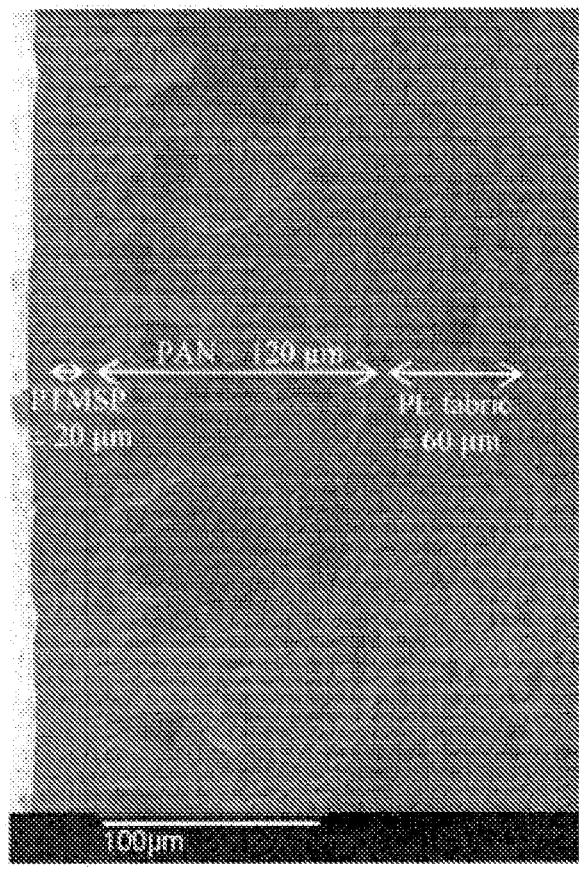
FIG. 3 provides a SEM image of a cross-section of a thin film PTMSP pervaporation membrane according to an embodiment of the present invention comprising a thin PTMSP-silica coating applied onto a PAN porous support layer.

FIGS. 1, 2 and 3 show SEM images of cross-sections of thin film PTMSP pervaporation membranes according to the present invention. FIGS. 1 and 2 show a thin PTMSP-silica film coated on a PVDF support layer. The average coating thickness ranges between 6 and 12 μm. FIG. 3 shows a thin PTMSP-silica film coated on a PAN support layer. The average coating thickness is about 20 μm. In table 1, the characteristics of the pervaporation membranes according to the present invention are compared to two commercial PDMS-based membranes, PERVAP 4060 and Pervatech.

TABLE 1

Performance of thin film PTMSP-silica pervaporation membranes and commercial OPV membranes in the separation of a 10/90 (v/v) % ethanol/water mixture.

| Support | Thickness coating | Flux | α (EtOH/H$_2$O) | PSI (kg/m$^2$ · h) |
|---|---|---|---|---|
| PAN (dried) | ±20 μm | 2.7 kg/(m$^2$ · h) | 11 | 27 |
| PVDF (dried) | ±6 to 12 μm | 2.5 kg/(m$^2$ · h) | 11 | 25 |
| PVDF (water saturated) | ±6 to 12 μm | 3.7 kg/(m$^2$ · h) | 12 | 41 |
| PERVAP 4060 | ±2 μm | 1.9 kg/(m$^2$ · h) | 7 | 11 |
| Pervatech | ±2 μm | 3.3 kg/(m$^2$ · h) | 6 | 15 |

Thin film PTMSP-silica membranes were successfully prepared and applied in pervaporation of ethanol/water mixtures. Characterization of the membranes showed ethanol/water separation factors (represented as α (EtOH/H$_2$O) in Table 1) around 12 and fluxes up to 3.7 kg/(m$^2$·h), establishing a 5 to 8 fold flux rise as compared to dense PTMSP-silica membranes (data not shown). Compared to commercial available membranes the membranes according to the present invention are shown to be beneficial both in terms of ethanol selectivity and flux. PV results suggest the use of a water-saturated PVDF support since permeate fluxes can be increased by 48% at unaltered selectivity's. Due to their attractive flux-selectivity combination, the PTMSP-silica thin film membranes clearly have potential in the removal of alcohols from aqueous streams.

The invention claimed is:

1. A membrane comprising an aggregate filled poly(1-trimethylsilyl-1-propyne) coating on a porous support, wherein the average thickness of said coating is at most 25

μm, wherein said membrane is a pervaporation membrane, wherein the ratio of aggregate versus poly(1-trimethylsily-1-propyne ranges between 2:1 and 1:2 and there is a ethanol/water pervaporation flux and the ethanol/water pervaporation flux through the membrane is at least 2.0 kg/(m$^2$·h) and the membrane has a separation factor wherein the separation factor is at least 7.

2. The membrane according to claim 1, wherein said porous support comprises a porous polyacrylonitrile or polyvinylidene fluoride membrane.

3. The membrane according to claim 2, wherein said porous support comprises a porous polyacrylonitrile membrane and the average thickness of said aggregate filled poly(1-trimethylsilyl-1-propyne) coating ranges between 2 and 25 μm.

4. The membrane according to claim 2, wherein said porous support comprises polyvinylidene fluoride and the average thickness of said aggregate filled poly(1-trimethylsilyl-1-propyne) coating ranges between 0.5 and 25 μm.

5. The membrane according to claim 1, wherein said aggregate filled poly(1-trimethylsilyl-1-propyne) coating comprises aggregates having an average aggregate size of at least 50 nm and smaller than 200 nm.

6. The membrane according to claim 1, wherein said aggregate comprises an aggregate of particles of silica or another metal oxide.

7. The membrane according to claim 1, wherein said membrane comprises an additional support.

8. A method for the manufacturing of a pervaporation membrane according to claim 1, said method comprising the steps of coating a porous support with an aggregate-filled poly(1-trimethylsilyl-1-propyne) solution such that the average thickness of said coating after drying is at most 25 μm.

9. An apparatus for separating a mixture of components by pervaporation or nanofiltration, the apparatus comprising the pervaporation membrane according to claim 1.

10. A method for separating a mixture of components by pervaporation or nanofiltration comprising contacting a liquid stream, comprising said mixture of components, with the membrane of claim 1.

11. The method according to claim 10, wherein said mixture of components comprises a mixture of water and an alcohol and wherein the mixture of components is separated in an alcohol-rich fraction and an alcohol-poor fraction.

12. The membrane according to claim 1, where the ethano/water pervaporation flux through the membrane is at least 2.5 kg/(m$^2$·h).

13. The membrane according to claim 1, where the separation factor is at least 10.

14. A method for the manufacturing of a pervaporation membrane comprising the steps of:
 (a) coating a porous support with an aggregate filled poly(1-trimethylsilyl-1-propyne) solution; and,
 (b) evaporating said aggregate filled poly(1-trimethylsilyl-1-propyne) solution on said porous support for at least 8 hours at a temperature ranging between 20 and 75° C., thereby providing a porous support comprising a pervaporation membrane comprising an aggregate filled poly(1-trimethylsilyl-1-propyne) coating, wherein the average thickness of said aggregate-filled poly(1-trimethylsilyl-1-propyne)coating is at most 25 μm and wherein the ratio of aggregate versus poly(1-trimethylsilyl-1-propyne ranges between 2:1 and 1:2 and where there is a ethanol/water pervaporation flux and the ethanol/water pervaporation flux through the membrane is at least 2.0 kg/(m2·h) and the membrane has a serperation factor wherein the separation factor is at least 7.

15. The according to claim 14, wherein the pervaporation membrane of step (b) is thermally treated, thereby removing residual solvents.

* * * * *